Figure 2:
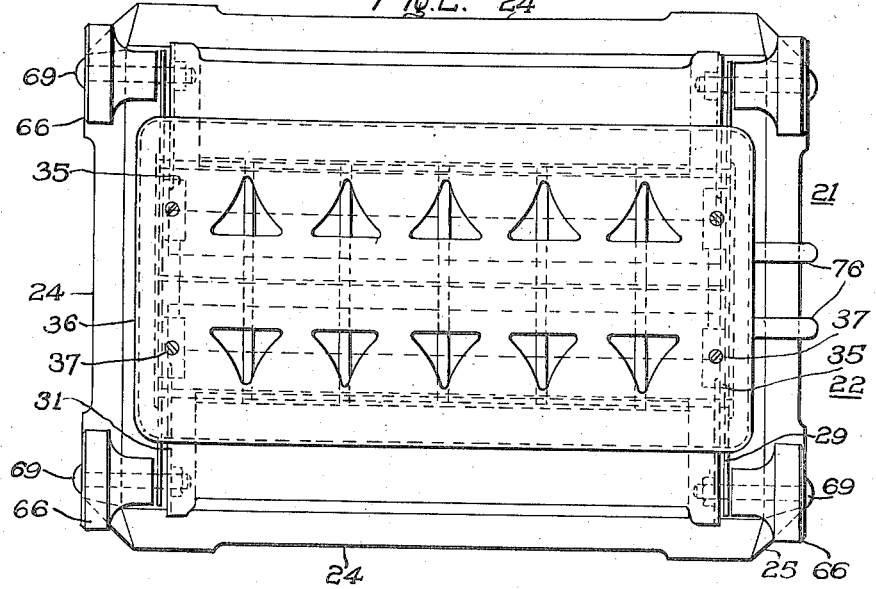

April 28, 1925.

O. A. COLBY

TOASTER

Filed April 6, 1923  3 Sheets-Sheet 1

1,535,580

WITNESSES:
A. J. Shiefelbein
H. M. Biebel

INVENTOR
Ora A. Colby.
BY
Wesley G. Carr
ATTORNEY

April 28, 1925.
O. A. COLBY
TOASTER
Filed April 6, 1923
1,535,580
3 Sheets-Sheet 2
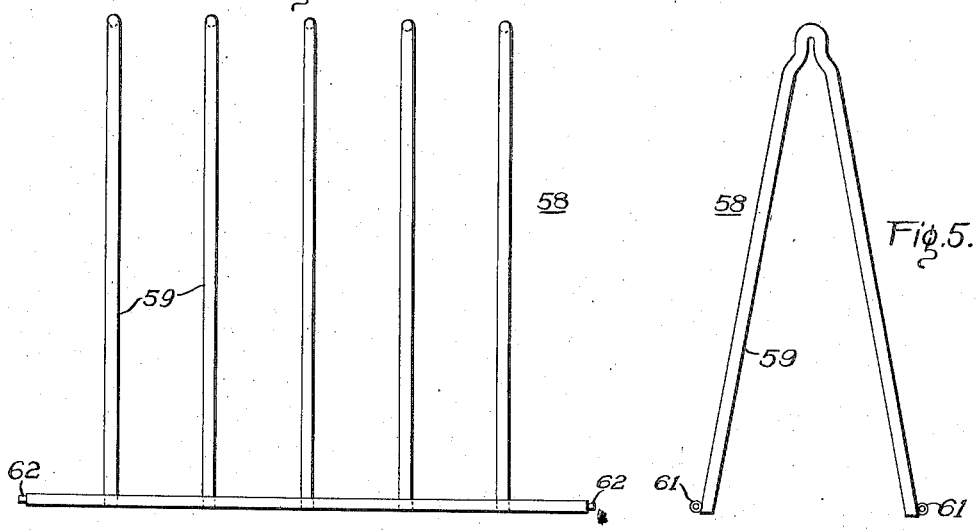
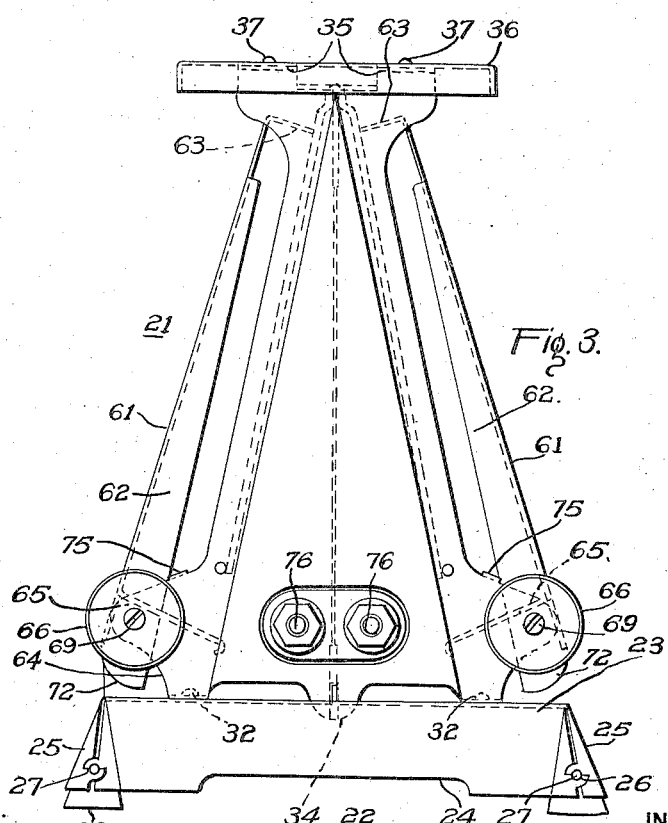
WITNESSES:
INVENTOR
Ora A. Colby.
BY
ATTORNEY

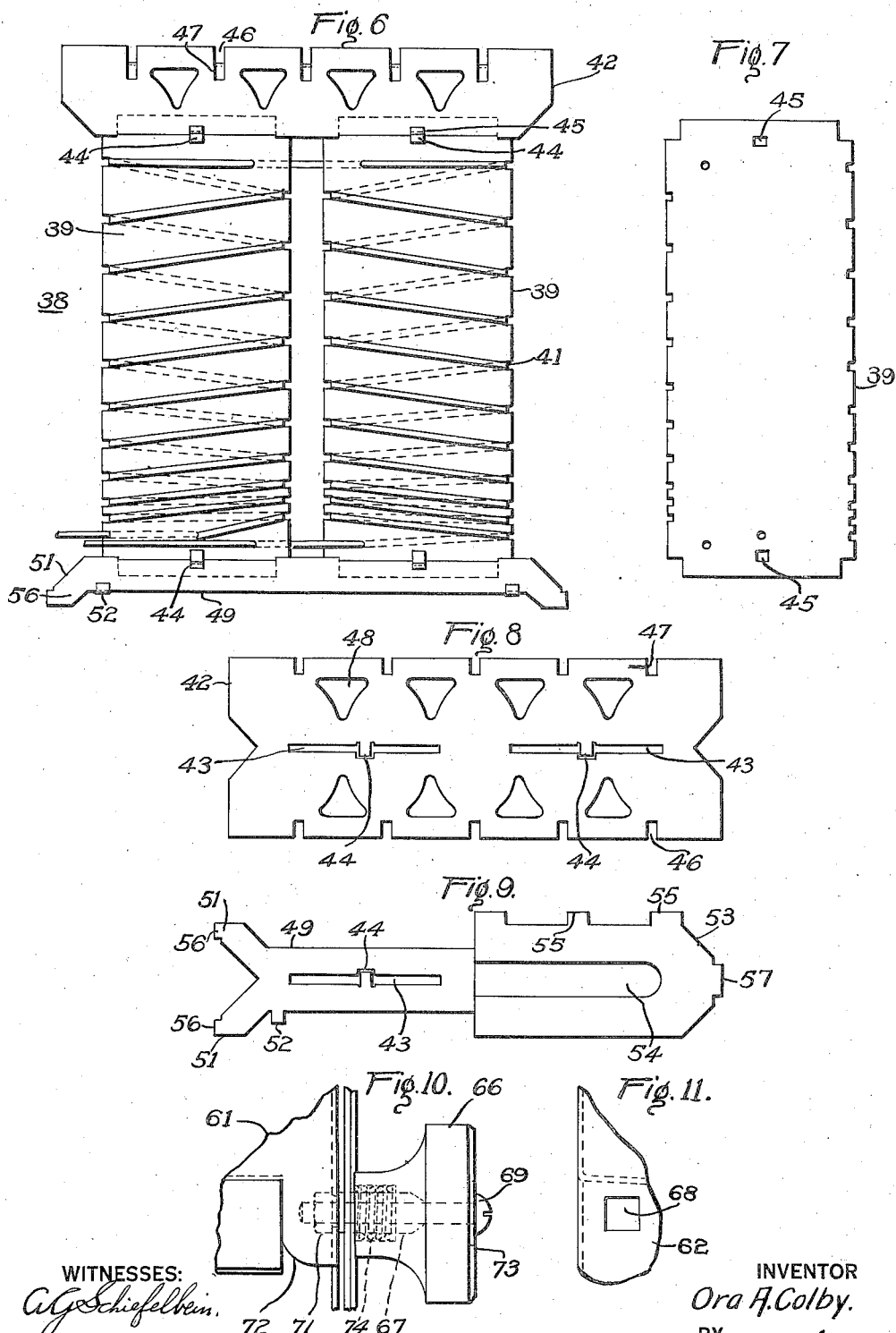

Patented Apr. 28, 1925.                                              1,535,580

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

TOASTER.

Application filed April 6, 1923. Serial No. 630,271.

*To all whom it may concern:*

Be it known that I, ORA A. COLBY, a citizen of the United States, and a resident of Irwin, in the county of Westmoreland and State of Pennsylvania, have invented a new and useful Improvement in Toasters, of which the following is a specification.

My invention relates to electric heating devices and particularly to electric toasters.

The object of my invention is, in general, to provide an electric table toaster of relatively simple and inexpensive construction.

More specifically, one object of my invention is to provide a tray operating means for an electric toaster that is of novel, simple and inexpensive construction.

Another object of my invention is to provide an improved base for an electric toaster.

Another object of my invention is to provide a relatively simple and inexpensive rack for an electric toaster.

Another object of my invention is to provide a relatively simple and inexpensive heating element for an electric toaster.

In practicing my invention, I provide a sheet metal base having integral depending flanges, the end portions of which are angularly disposed relatively to the flanges and have integral arcuate extensions that cooperate with each other to interlock the adjacent edge portions. A pair of vertically-extending sheet metal side-frames are secured in spaced relation on the base and a top plate is mounted on, and secured to, the top portions of the two side frames.

A heating element located on the base and between the side frames comprises a plurality of relatively thin sheets of insulating material notched at their edges to receive a resistor wound thereon, and a bottom and a top edge strip of relatively thin sheet metal, each folded on its longitudinal axis and having laterally extending tongue portions for holding the strips in proper operative positions relatively to the sheets of insulating material and for clamping together the adjacent edge portions of the strips. The top and the bottom edge strips engage the side frames to hold the heating element in proper operative vertical position on the base.

A rack is provided for supporting slices of bread during the toasting period and it, comprises a plurality of relatively thin metal rods, each bent to substantially V-shape and having the respective ends welded to cross bars, the ends of which fit into openings in the side frames to hold the rack in its proper operative position therebetween.

The apices of the bent wires comprising the rack fit into spaced notches provided in the top edge strip of the heating element whereby the upper ends of the wires are held in proper spaced relation and whereby, also, the upper edge of the heating element is held in its proper operative position laterally of the side frames.

A pair of material-supporting trays are pivotally mounted in the side frames and have limited turning movement relatively thereto. Each of the trays is provided with two turning members, each comprising a tubular member having one end secured to a side portion of the tray, and buttons of molded insulating material mounted on and interlocked with the tubular member, a bolt to hold the button on the tubular member and a helical spring in the button surrounding the tubular member.

A pair of terminal pins are insulatedly mounted on one of the side frames immediately above the base.

Figure 1:
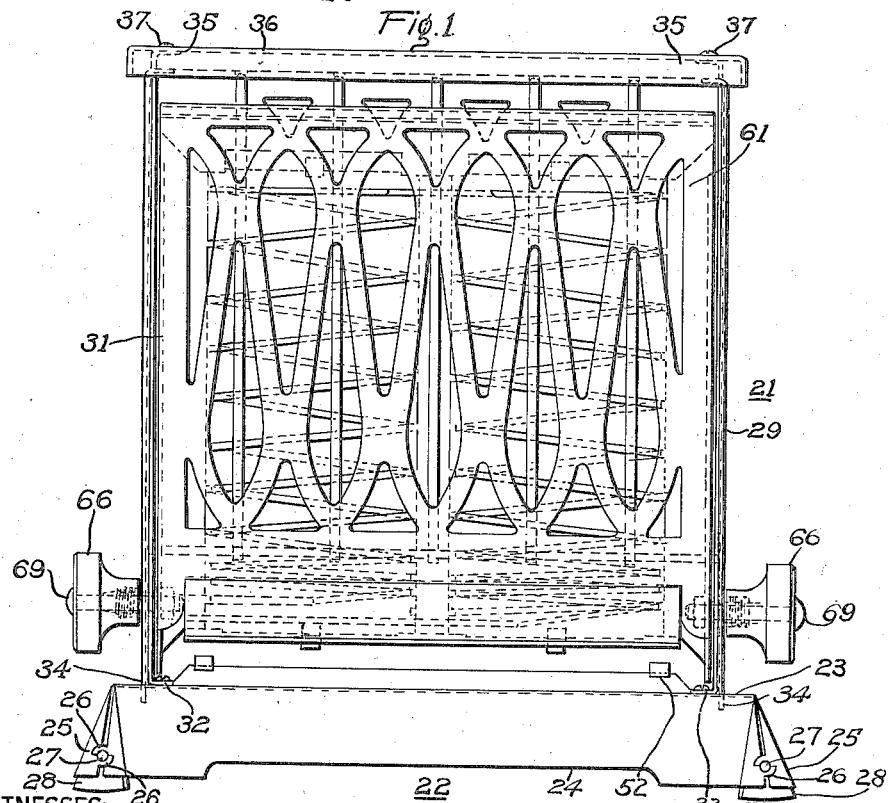

In the drawings, Figure 1 is a view, in side elevation, of an electric toaster embodying my invention, Fig. 2 is a top plan view thereof, Fig. 3 is a view in end elevation thereof, Figs. 4 and 5 are views, in side and in end elevation, respectively, of a rack comprising a part of the device embodying my invention, Fig. 6 is a view, in front elevation. of a heating element comprising a part of the device embodying my invention, Fig. 7 is a view, in elevation, of a sheet of insulating material comprising a part of the heating element, Fig. 8 is a developed top plan view of a top edge-strip comprising a part of the heating element, Fig. 9 is a composite top plan view of two forms of bottom edge-strips comprising a part of the heating element, Fig. 10 is a view, in elevation, of a portion of a device embodying my invention, illustrating particularly a tray operating means, and Fig. 11 is a view, in side elevation, of a portion of a tray comprising a part of the device embodying my invention.

An electric toaster, 21, comprises a base 22 which is formed from a single punched sheet of relatively thin material. The base 22 comprises a top portion 23 that is normally located in a substantially horozontal position, and a plurality of integral depending flange portions 24 which extend angularly relatively to the portion 23. The lower edge of the flanges 24 may be cut away at the intermediate portions of the respective flanges in order to provide a more pleasing design for the base.

Each of the depending flanges 24 is provided with integral end portions 25 that extend angularly relatively to the flanges 24 and in substantially the same downward direction. The end portions 25 extend towards, and to within a short distance, of each other and are severally provided with integral arcuate extensions 26 that co-operate with a bolt or pin 27 extending therebetween and through a heat insulating supporting member 28 to clamp the member 28 against the inner surface of the two portions 25 and at the same time interlock them. The arcuate extent of the parts 26 is substantially 90° and the outer ends of the upper and of the lower members 26, are located in substantially the same horizontal line and the dimensions of the parts are such as to provide a substantially cylindrical opening therebetween through which the pin 27 may extend.

A pair of vertically-extending side frames 29 and 31, each of relatively thin sheet metal, are located on the base and in operative engagement with the upper surface of the part 23. The general configuration of the side frames is triangular, the wider portion thereof being located at the bottom. Two integral and laterally-extending tongue portions 32 are provided at the bottom edge of each of the side frames 29 and 31 through which extend small machine bolts 33 to suitably secure the side frames on the base 22. Each of the side frames is provided with an integral, slotted depending portion 34 which extends through a suitable opening in the top 23 to assist in holding the side frames in proper operative positions on the base. The upper edge portion of each of the side frames is provided with inturned flanges 35, substantially as indicated in Fig. 1 of the drawing, to provide a more suitable support for a top member 36 which comprises a punched piece of sheet metal. The intermediate part of the top edge portion of each of the side frames 29 and 31 is bent inwardly in a plane below that of the flanges 35, and is slotted for a purpose to be herinafter set forth in detail.

Machine screws 37 extend through the top 36 into the flanges 35 to permit of holding the top on the side frames and of holding the side frames in their proper operative and spaced positions on the base 22. The top 36 may be provided with a plurality of punched openings, as illustrated in Fig. 2 of the drawings, to give the device a more pleasing appearance.

A heating element 38 comprises a pair of relatively thin sheets 39 of mica that are provided with a plurality of spaced notches at each edge to permit the winding of a resistor member 41 on the sheets and through the notches in substantially the manner indicated in Fig 6 of the drawing. The two sheets of insulating material 39 are located in tandem parallel relation and are held in this position at the top by an edge strip 42. The edge strip 42 is shown in detail in Fig. 8 of the drawings, and comprises a punched strip of relatively thin sheet metal bent or folded on its central longitudinal axis. Openings 43 in the strip 42 are located on the central longitudinal axis of the respective sheets of mica 39, the length of the slots 43 being slightly less than the width of the sheets to cooperate with shouldered portions of the sheets in holding the same, as indicated more particularly in Fig. 7 of the drawing. Laterally extending tongue portions 44 are punched out of the metal strip 42 and extend across the slots 43, the tongue portions extending through the sheets of mica 39 and folded around the opposite portion of the strip 42 in the assembled heating element. An opening 45 is provided in each of the sheets of mica adjacent to top edge thereof, to permit of the tongue portion 44 extending therethrough.

At one of the edges of the strips 42, there is provided a plurality of spaced notches 46, and a plurality of integral tongue portions 47 are provided at the opposite edge, the tongue portions 47 registering with the notches 46 so that when the strip 42 has been folded on its central longitudinal axis, the tongue portions 47 may be bent around the adjacent folded portion of the sheet 42 in the notches 46 to clamp the edges of the two portions together.

If desired, openings 48 may be provided in the edge strips 42 to provide a more ornamental appearance thereof when folded.

A bottom edge strip 49 is of substantially the same construction as heretofore described for the upper edge strip 38, the dimensions, however, being slightly different. The edge strip 49 has an intermediate portion having two end portions 51 which extend angularly therefrom, substantially as illustrated in the left hand part of Fig. 9 of the drawings.

A longitudinally extending slot 43 is provided on the central longitudinal axis and serves the same purpose as hereinbefore described in connection with the top edge strip. When the strip 49 is bent on its central longitudinal axis it assumes substantially the form as indicated in Fig. 6, the two angularly extending end portions 51 combining to form the end, or downwardly extending, supporting members for the heating element 38.

Tongue portions 52 integral with the strip 49 extend laterally therefrom and are bent around the adjacent folded part and securely clamp them together. The bottom edge of the sheets of mica 39 fit into the slot 43 in the member 49 as was hereinbefore described in connection with the top edge strip 42, and tongue members 44 extend through openings 45 in the respective sheets 39 and fold over the adjacent bent portion of the sheet to tightly clamp the two parts together and on the mica sheets.

In the right hand part of Fig. 9, I have illustrated a modified form of bottom edge strip 53, which in its entirety comprises a punched strip of sheet metal, of substantially elongated oval form, having a relatively wide slot 54 extending centrally and longitudinally thereof. Laterally extending, integral tongue portions 55, of suitable width, are provided which extend through suitable openings in the sheets 39 and fold around the edge of the adjacent folded part of the strip 53, as hereinbefore described in connection with the tongue members 47 and 52 of the top and bottom edge strips.

The laterally-extending portions 51 of the bottom edge strip 49 are provided with reduced end portions 56 that are adapted to fit into the slot in the depending part 34 of the respective side frames to hold the heating element in its proper operative position laterally of the side frames on the base 22. The strip 53 is provided with an integral end portion 57 that serves the same purpose as the end portions 56 just described. The edge strips 42 and 49 operatively engage the mica sheets 39 at or on their central longitudinal axis and the edge portions thereof extend away from the heating element, while, the edge portions of the strip 53 engage and clamp the bottom edges of the mica sheets 39 therebetween and the central longitudinal end portions of the strip 53 operatively engage and rest upon the top of the base 22.

The end portions of the folded top edge strip 42 fit into the hereinbefore mentioned slots in the intermediate lateral extensions of the side frames 29 and 31, whereby the upper part of the heating element is held in its proper operative position laterally of and between the side frames 29 and 31.

A rack member 58, against which the slices of bread rest during the toasting operation, comprises a plurality of relatively thin rods or wires 59 that are respectively bent to substantially V-shape. The ends of the wires 59 are secured in any suitable manner, such as by welding, to cross bars 61 that are severally provided with reduced end portions 62 adapted to fit into suitable openings in the side frames 29 and 31, the rack 58 being located in what may be termed an inverted position between the side frames 29 and 31.

The apices of the respective bent wires 59 fit into the notches formed by the punched laterally extending tongue portions 47 in the top edge strip 42 of the heating element. The portions of the wires 59 immediately adjacent the apices are bent to substantial parallelism for a short distance in order that the top edge strip 42 may fit closely within and between the two parts of the apex. This construction interlocks the upper edge of the heating element and the rack and provides a relatively solid and yet light interlocked heating element and rack-supporting structure. As the apices of the respective bent wires 59 are located in the notches hereinbefore described, they are maintained in their proper operative and spaced relation relatively to each other, thereby making it unnecessary to provide any laterally-extending tie rod or bracing means for the upper part of the rack.

A plurality of material-supporting trays 61 comprise punched and formed sheet metal plates which are severally provided with laterally-extending side flanges 62 so that a slice of bread may be held thereon in proper operative position relatively thereto. At the upper portion thereof, the plate is bent at substantially right angles to the plane of the tray 61, in the form of a laterally and inwardly extending flange 63 which serves to limit the turning movement of the respective trays against the sides of the rack member 58. Each of the trays 61 is pivotally mounted in the side frames 29 and 31 at a point adjacent to and slightly above the lower edge of the side frames, they being each provided with integral extensions 64 for that purpose.

Each of the trays 61 is provided with an inwardly-extending integral flange portion 65 at its lower edge, upon which the bottom edge of the slice of bread may rest. The angle at which the flange 65 extends inwardly from the tray 61 and the angle between the bent portions of the wires 59 of the rack 58 is so selected that upon giving the respective trays 61 an outward and downward turning movement, the position of the slice of bread on the tray is reversed, according to the principle of the turn-over toaster. This construction is described and claimed in the S. A. Wiltsee Patent No. 1,105,230.

Means for causing a turning movement of the trays 61 comprises a button 66 of a suitable heat-insulating material which may be molded to any suitable or desired shape to permit of its being easily grasped by the operator. A tubular member 67 (see particularly Fig. 10) is located within a suitable axial opening in the knob or button 66 and is provided with a doubly flattened end portion in order that the button and the tubular member may interlock to prevent turning movement of one member relatively to the other. The outer end of the tubular member 67 extends through a suitable opening 68 in the side portion 62 of the trays 61. The opening 68 is made substantially square in order that a shoulder portion of the tubular member 67 may fit into the opening 68 and be suitably wedged therein by the use of a square drifting tool which forces portions of the end of the tubular member 67 into the corners of the opening 68, whereby the two are interlocked.

In order to hold the button 66 on the member 67 and to secure the member 67 firmly against the side portions 62, a suitable machine bolt 69 extends through the knob 66, tubular member 67 and the opening 68 in the side portion 62, a nut 71 being provided at the inner end thereof to hold the same together. Each of the sides 62 of the trays is provided with an integral depending portion 72 illustrated more particularly in Fig. 10 of the drawing in order to hide the nut 71 and the inner end of the bolt 69.

If desired, a spring washer 73 may be placed in the head of the bolt 69 to allow for any possible inequalities in the dimensions of the knob or button 66 and its fit upon the member 57 or to compensate for any possible expansion of the molded material comprising the button 66.

As it is desired to have the trays operate smoothly as regards their turning movement on their tubular bearing members 67, which, of course, extend through suitable openings in the portions 64 of the side frames, I provide a helical spring 74 located in each of the knobs 66 surrounding the tubular member 67, the inner end of which operatively engages the outer surface of the side frame. The distance between the inner faces of the side frames is made slightly greater than the distance between the outer faces of the lateral flanges 62 and the spring members 74 in each of the knobs 66 provides not only a frictional restraining action to every movement of the tray in its bearings, but also provides resilient means for yieldingly maintaining the respective trays between the side frames of the toaster.

On each of the extensions 64 of the side frames, there is provided, at the upper portion thereof, an integral, inwardly-extending, tongue portion 75 that co-operates with the depending extension 72 of the trays 61 to limit the downward turning movement of the trays when actuated by the operator turning either of the knobs 66 secured to the respective sides of the trays. The location of the tongue members 75 and the lateral width of the portion 72 are so selected that the top portion of the trays will be just above the surface of the table upon which the toaster is resting, when the inner edges of the portion 72 engage the bottom surface of the tongue members 75.

A terminal construction for the toaster may comprise a pair of contact pins 76 that are insulatedly mounted in one of the side frames immediately above the base. Any suitable or desired construction may be employed and as they form no part of my invention will not be herein further described.

In the manufacture of the device embodying my invention, a number of the hereinbefore described parts may be completely assembled, before they are mounted in the toaster. For instance, the heat-insulating supporting members 28 may be placed in their proper operative position in the base 22 and a number of the bases completed ready for further assembly. The tubular members 67 may be secured, as hereinbefore described, to the side portion 62 of the trays ready for further assembly and mounting in the side frames. The heating element may be completely assembled in substantially the form illustrated in Fig. 6 of the drawing ready for mounting in the toaster.

The operation of welding the individual wires 59 to the tie rods 61 may be done while the rods or wires 59 are still straight and the entire structure then may be bent at one time to substantially the form illustrated in Fig. 5 of the drawing, this making it unnecessary to bend each of the wires or rods 59 separately. One of the side frames may be mounted in its proper operative position on the base 22, the heating element, rack, and trays, placed in their proper operative positions, after which the other side frame may be placed in its proper operative position and thereafter the top placed on and secured to the top of the side frames. The knobs or buttons 66, together with the springs 74 and the bolt 69 may then be mounted and the ends of the resistor 41 be connected to the terminal pins, thereby completing the assembly of the toaster.

Various modifications and changes may be made herein without departing from the spirit and scope of my invention, and I desire, therefore, that only such limitations shall be placed thereon as are indicated in the appended claims or are imposed by the prior art.

I claim as my invention:

1. In a toaster, in combination, a base provided with depending, integral, flange portions, said flange portions having extensions thereon, angularly disposed relatively to said flange portions, and means co-operating with said extensions to interlock the same.

2. A toaster comprising a base having depending integral flange portions, said flanges having extensions of arcuate form angularly disposed relatively thereto, and means disposed between said extensions of arcuate form for interlocking the same.

3. A toaster comprising a base having angularly extending integral flanges, the end portions of said flanges extending in the same plane and angularly relatively to said flanges, extensions of acuate form integral with said end portions and lying in the same plane, supporting members adjacent said end portions, and means for securing said supporting members against said end portions and for interlocking said extensions of arcuate form.

4. In a toaster, in combination, a base provided with a plurality of integral, angularly extending flanges, said flanges having integral extensions of arcuate form, angularly disposed relatively to said flanges, a supporting member located adjacent the inner surface of each pair of arcuate extensions, and means for securing said supporting members against said extensions and for interlocking the same.

5. In an electric toaster, in combination, a base, and a heating element comprising a vertically-extending sheet of insulating material and a punched strip of sheet metal folded on its central longitudinal axis, operatively engaging and clamping the lower edge of said sheet and having integral end portions for operatively engaging said base to support said heating element thereby.

6. In an electric toaster, in combination, a base, and a heating element comprising a vertically-extending sheet of insulating material and a punched strip of sheet metal folded on its central longitudinal axis, operatively engaging and clamping the lower edge of said sheet and integral tongue portions extending through said sheet to hold the same in said bent sheet metal strip.

7. In an electric toaster, in combination, a base, and a heating element comprising a pair of vertically-extending, spaced, sheets of insulating material, punched strips of sheet metal, each folded on its central longitudinal axis, operatively engaging and clamping the upper and the lower edges of said sheets of insulating material, said strips of sheet metal having integral tongue portions extending through said sheets of material and bent over the folded portion of said strips.

8. In an electric toaster, in combination, a base, an electric heating element on said base having a notched, metal, binding strip at its upper edge and a material-supporting rack having portions extending through the notches of said binding strip.

9. In an electric toaster, in combination, a base, an electric heating element on said base, a metal binding strip at the upper edge of said heating element having a plurality of spaced notches in its upper edge, and a material-supporting rack having portions fitting into said notches and interlocked with said heating element.

10. In an electric toaster, in combination, a base, an electric heating element on said base, and a material-supporting rack interlocked with said heating element.

11. In an electric toaster, in combination, a base, a pair of vertically-extending spaced side frames on said base, a vertically-extending heating element on said base between said side frames, and a material-supporting rack, of substantially V-shape in lateral section, having its lower portions secured in and supported by said side frames and having its upper portion interlocked with said heating element.

12. In an electric toaster, in combination, a base, a vertically-extending electric heating element on said base, and a material-supporting rack comprising a plurality of spaced rods bent to substantially V-shape, enclosing said heating element and interlocked therewith.

13. In an electric toaster, in combination, a base, a material-supporting rack, of inverted V-shape in lateral section, and comprising a plurality of bent spaced rods, and an electric heating element having embodying means at its upper edge for maintaining the apices of said bent rods in normal spaced relation.

14. In an electric toaster, in combination, a base, a side frame on said base, a tray, a tubular member secured to said tray and extending through said side frame to permit of a turning movement of said tray and tubular member relatively to said frame and turning knob on said tubular member interlocked therewith.

15. In an electric toaster, in combination, a base, a side frame on said base, a tray, a tubular member secured to said tray and extending through said side frame to permit of a turning movement of said tray and tubular member relatively to said frame, a turning knob mounted on and interlocked with said tubular member, means extending through said tubular member and knob for holding them in their proper operative positions, and resilient means in said knob frictionally engaging said side frame.

16. In an electric toaster, in combination, a base, a pair of side frames located in spaced relation on said base, a tray, a plurality of tubular members secured to said tray at the side portions thereof and extending through the respective side frames to permit of a turning movement of said tray relatively to said frames, a turning knob mounted on and interlocked with the respective tubular members, and resilient means in each of said knobs for yieldingly positioning said tray longitudinally of said side frames.

17. In an electric toaster, in combination, a base, a pair of side frames located in spaced relation on said base and each having an opening therethrough adjacent the lower portion thereof, a tray located between said frames and pivotally mounted in said openings and having a portion normally extending below said openings, and means integral with said respective side frames located above said openings for co-operating with said depending portion to limit the turning movement of said tray in one direction.

18. An electric toaster comprising a heating element, said heating element comprising a plurality of spaced sheets of insulating material, and a top and a bottom edge strip for said sheets, each edge strip comprising a punched sheet metal piece folded on its longitudinal axis and enclosing an edge portion of said sheets, and integral tongue portions extending laterally through said sheets of insulating material to hold the edge strips in proper operative positions relatively to said sheets.

19. An electric toaster comprising a heating element, said heating element comprising a plurality of spaced sheets of insulating material, and a top and a bottom edge strip for said sheets, each edge strip comprising a punched sheet metal piece folded on its longitudinal axis and enclosing an edge portion of said sheets, and integral tongue portions on one of said folded parts for clamping them together.

In testimony whereof, I have hereunto subscribed my name this 29th day of March, 1923.

ORA A. COLBY.